(12) United States Patent
Kang (10) Patent No.: US 10,450,229 B2
(45) Date of Patent: Oct. 22, 2019

(54) SLIM VERMICULITE BOARD FOR CONSTRUCTION FINISHING

(71) Applicants: VERMIKOREA CO., LTD, Namdong-gu, Incheon (KR); Seok Young Kang, Yeonsu-gu, Incheon (KR)

(72) Inventor: Seok Young Kang, Yeonsu-gu, Incheon (KR)

(73) Assignees: Vermikorea Co., Ltd., Namdong-gu, Incheon (KR); Seok Young Kang, Yeonsu-gu, Incheon (KR)

( * ) Notice: Subject to any disclaimer, the term of this patent is extended or adjusted under 35 U.S.C. 154(b) by 0 days.

(21) Appl. No.: 15/762,756

(22) PCT Filed: Sep. 5, 2016

(86) PCT No.: PCT/KR2016/009928
§ 371 (c)(1),
(2) Date: Mar. 23, 2018

(87) PCT Pub. No.: WO2017/052108
PCT Pub. Date: Mar. 30, 2017

(65) Prior Publication Data
US 2019/0077706 A1    Mar. 14, 2019

(30) Foreign Application Priority Data
Sep. 23, 2015   (KR) .................. 10-2015-0134392

(51) Int. Cl.
| | | |
|---|---|---|
| *C04B 14/20* | (2006.01) | |
| *E04B 1/74* | (2006.01) | |
| *C04B 14/30* | (2006.01) | |
| *C04B 28/26* | (2006.01) | |
| *C04B 38/08* | (2006.01) | |
| *C04B 20/06* | (2006.01) | |
| *E04B 1/94* | (2006.01) | |
| *E04C 2/04* | (2006.01) | |
| *C04B 111/28* | (2006.01) | |
| *C04B 111/40* | (2006.01) | |
| *C04B 111/52* | (2006.01) | |

(52) U.S. Cl.
CPC .......... *C04B 14/202* (2013.01); *C04B 14/305* (2013.01); *C04B 20/06* (2013.01); *C04B 28/26* (2013.01); *C04B 38/08* (2013.01); *E04B 1/74* (2013.01); *E04B 1/942* (2013.01); *C04B 2111/28* (2013.01); *C04B 2111/40* (2013.01); *C04B 2111/52* (2013.01); *E04C 2/04* (2013.01)

(58) Field of Classification Search
CPC ..... C04B 14/202; C04B 14/305; C04B 20/06; C04B 28/26; C04B 38/08; C04B 2111/28; C04B 2111/40; C04B 2111/52; E04B 1/74; E04B 1/942; E04C 2/04
See application file for complete search history.

(56) References Cited

U.S. PATENT DOCUMENTS 10,040,725 B2 *  8/2018  Perez-Pena ............. C04B 24/04

FOREIGN PATENT DOCUMENTS

| CN | 1099014 | 2/1995 | |
|---|---|---|---|
| CN | 103951372 | 6/2016 | |
| JP | 10-169158 A | 6/1998 | |
| JP | 2007-077717 A | 3/2007 | |
| KR | 10-20050081763 A | 8/2005 | |
| KR | 10-2013-0011465 A | 1/2013 | |
| KR | 10-2013-0027869 A | 3/2013 | |
| KR | 1020140080791 A * | 7/2014 | |
| WO | WO-2004007394 A1 * | 1/2004 | ............. C04B 28/26 |

OTHER PUBLICATIONS

International Search Report dated Jan. 11, 2017, issued in International Application No. PCT/KR2016/009928.

* cited by examiner

*Primary Examiner* — Anthony J Green
(74) *Attorney, Agent, or Firm* — Kilpatricktown Townsend & Stockton LLP (57) ABSTRACT

The present invention relates to a slim vermiculite board for construction finishing comprising, to 100 parts by weight of fired vermiculite, 2.5-3.5 parts by weight of an additive and 100-120 parts by weight of a binder. The slim vermiculite board can help create a beautiful and luxurious interior by means of products having the natural patterns and diverse colors of vermiculite, does not produce construction waste and can be used as an agricultural soil conditioner. Also, the slim vermiculite board is light and easy to install, does not cause efflorescence, is deformation-free and eco-friendly, and has excellent deodorizing, antibacterial and fire-resistant properties and an excellent sound absorption coefficient.

2 Claims, 13 Drawing Sheets

TEST REPORT

1. Report No. : CT13-72286
2. Client
   ○ Name : Vermikorea Inc.
   ○ Address : 16 Lot, 73 Block, Complex of Namdong Industrial Complex, 643-15 Gojan-dong, Namdong-gu, Incheon, Republic of Korea
   ○ Date of Receipt : July 12, 2013
   ○ Date of Issued : August 09, 2013
3. Use of Report: Quality Control
4. Test Sample: Vermiculite Board
5. Test Method
   (1) KS L 9105:2009

6. Test Results
   1) Vermiculite Board

| Test Items | Units | Test Methods | Test Results |
|---|---|---|---|
| Density | kg/m³ | (1) | 600 |
| Moisture content | % | (1) | 0.5 |
| Flexural failure load | N | (1) | 58 |
| Thermal resistance | (m²·K)/W | (1) | 0.12 |

[average temperature: 20 ℃]
(thickness: 10.95 mm)

---- End of Report ----

| Affirmation | Tested by | Moon-sik Kang | | Technical Manager | Byeong-gwon Ahn |

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose except for original use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

FIG. 7

TEST REPORT

*the way to trust* KCL

1. Report No. : CT13-72294
2. Client
   - Name : Vermikorea Inc.
   - Address : 16 Lot, 73 Block, Complex of Namdong Industrial Complex, 643-15 Gojan-dong, Namdong-gu, Incheon, Republic of Korea
   - Date of Receipt : July 12, 2013
   - Date of Issued : August 09, 2013
3. Use of Report: Quality Control
4. Test Sample: Vermiculite Board
5. Test Methods
   (1) KS F 2805 : 2004           (2) ASTM C 423 : 2009a

| Affirmation | Tested by | Moon-sik Kang | | Technical Manager | Byeong-gwon Ahn | |

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose other than use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

Page 1 of 2                                      Form QP-20-01-05(2)

FIG. 8

TEST REPORT

Report No.: CT13-72294

6. Test Results

1) Vermiculite Board

| Test Items | Units | Test Methods | Test Results |
|---|---|---|---|
| Sound absorption coefficient (1/3 octave band center frequency 100 Hz) | — | (1) | 0.03 |
| Sound absorption coefficient (1/3 octave band center frequency 125 Hz) | — | (1) | 0.03 |
| Sound absorption coefficient (1/3 octave band center frequency 160 Hz) | — | (1) | 0.05 |
| Sound absorption coefficient (1/3 octave band center frequency 200 Hz) | — | (1) | 0.08 |
| Sound absorption coefficient (1/3 octave band center frequency 250 Hz) | — | (1) | 0.09 |
| Sound absorption coefficient (1/3 octave band center frequency 315 Hz) | — | (1) | 0.14 |
| Sound absorption coefficient (1/3 octave band center frequency 400 Hz) | — | (1) | 0.21 |
| Sound absorption coefficient (1/3 octave band center frequency 500 Hz) | — | (1) | 0.32 |
| Sound absorption coefficient (1/3 octave band center frequency 630 Hz) | — | (1) | 0.52 |
| Sound absorption coefficient (1/3 octave band center frequency 800 Hz) | — | (1) | 0.74 |
| Sound absorption coefficient (1/3 octave band center frequency 1000 Hz) | — | (1) | 0.93 |
| Sound absorption coefficient (1/3 octave band center frequency 1250 Hz) | — | (1) | 0.93 |
| Sound absorption coefficient (1/3 octave band center frequency 1600 Hz) | — | (1) | 0.60 |
| Sound absorption coefficient (1/3 octave band center frequency 2000 Hz) | — | (1) | 0.59 |
| Sound absorption coefficient (1/3 octave band center frequency 2500 Hz) | — | (1) | 0.63 |
| Sound absorption coefficient (1/3 octave band center frequency 3150 Hz) | — | (1) | 0.62 |
| Sound absorption coefficient (1/3 octave band center frequency 4000 Hz) | — | (1) | 0.62 |
| Sound absorption coefficient (1/3 octave band center frequency 5000 Hz) | — | (1) | 0.63 |
| NRC (Noise reduction Coefficient) | — | (2) | 0.50 |

※ Test conditions (vacancy): Temperature (30.7 ± 1.0) ℃, humidity (74 ± 5) %
※ Test conditions (sample installed): Temperature (31.0 ± 1.0) ℃, humidity (72 ± 5) %
※ The composition of the sample has been proposed by the client
o Installation area: width 3,000 mm X length 3,300 mm (9.8 m2)
o Unit size: Width 300 mm X length 600 mm X thickness 20 mm. End.

---- End of Report ----

FIG. 9

TEST REPORT

1. Report No. :   CT13-72278
2. Client
   - Name :   Vermikorea Inc.
   - Address :   16 Lot, 73 Block, Complex of Namdong Industrial Complex, 643-15 Gojan-dong, Namdong-gu, Incheon, Republic of Korea
   - Date of Receipt: July 12, 2013
   - Date of Issued: August 23, 2013
3. Use of Report:   Quality Control
4. Test Sample:   Vermiculite board
5. Test Methods
   (1) KS F 2271 : 2008          (2) KS FISO 1182 : 2004
6. Test Results ---- Continued ----

| Affirmation | Tested by | Moon-sik Kang | | Technical Manager | Byeong-gwon Ahn |

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose other than use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

Page 1 of 6                          FormQP-20-01-05(2)

FIG. 10

TEST REPORT

Report No. : CT13-72278
Test Results

| Test Items | | Units | Test Results | | | Criteria | Test Methods |
|---|---|---|---|---|---|---|---|
| | | | 1 | 2 | 3 | | |
| Incombustibility test | Mass reduction rate | % | 6.9 | 6.7 | 6.8 | 30 or less | KS F ISO 1182:2004 |
| | Difference between peak temperature and final equilibrium temperature | ℃ | 1.4 | 1.4 | 1.0 | Should not exceed 20 | |
| Gas hazard test | Average deed stopping time | min : s | 13:37 | 13:34 | - | 9:00 or more | KS F 2271:2006 |

※ Meeting the standards of noncombustible material in accordance with the Ministry of Land, Transport and Maritime Affairs Notice No. 2012-624

■ Specimen and Test conditions

| Items | Incombustibility test | Gas hazard test |
|---|---|---|
| Size of specimen (mm) | Diameter: 45, height: 50 (sample was stacked and subjected to tests) | 220 × 220 × 9.5 |
| Density (kg/m³) | 480 | |
| Composition of sample (proposed by Client) | Vermiculite board | |
| Heated surfaces | - | Front and back surfaces are the same |
| Specimen presented | | |
| Test time | 20 min | 15 min |
| Mouse | - | ICR mouse, female |

- Continued -

Page 2 of 6

Form QP-20-01-05(2)

FIG. 11

TEST REPORT

1. Report No.  :  CT13-72248
2. Client
   - Name:  Vermikorea Inc.
   - Address: 16 Lot, 73 Block, Complex of Namdong Industrial Complex, 643-15 Gojan-dong, Namdong-gu, Incheon, Republic of Korea
   - Date of Receipt:  July 12, 2013
   - Date of Issued:  August 02, 2013
3. Use of Report:  Quality Control
4. Test Sample:  Vermiculite board
5. Test Methods
   (1) Waste process test standard  (2) KS L 5300:2009
       (Ministry of the Environment Notice No. 2001-160)

| Affirmation | Tested by | Moon-sik Kang | | Technical Manager | Byeong-gwon Ahn | |

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose other than use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

Page 1 of 2  Form QP-20-01-05(2)

FIG. 12

TEST REPORT

Report No.: CT13-72248

6. Test Results

1) Vermiculite Board

| Test Items | Units | Test Methods | Test Results |
|---|---|---|---|
| Lead | mg/L | (1) | Undetected (quantitative limit: 0.04) |
| Hexavalent chromium | mg/L | (1) | Undetected (quantitative limit: 0.01) |
| Copper | mg/L | (1) | 0.058 |
| Cadmium | mg/L | (1) | Undetected (quantitative limit: 0.002) |
| Arsenic | mg/L | (1) | Undetected (quantitative limit: 0.005) |
| Mercury | mg/L | (1) | Undetected (quantitative limit: 0.005) |
| Cyanogen | mg/L | (1) | Undetected (quantitative limit: 0.01) |
| Organophosphorus (EPN) | mg/L | (1) | Undetected (quantitative limit: 0.005) |
| Organophosphorus (parathion) | mg/L | (1) | Undetected (quantitative limit: 0.005) |
| Organophosphorus (methyl dimethone) | mg/L | (1) | Undetected (quantitative limit: 0.005) |
| Organophosphorus (diazinon) | mg/L | (1) | Undetected (quantitative limit: 0.005) |
| Organophosphorus (pentoate) | mg/L | (1) | Undetected (quantitative limit: 0.005) |
| Trichlorethylene | mg/L | (1) | Undetected (quantitative limit: 0.008) |
| Tetrachlorethylene | mg/L | (1) | Undetected (quantitative limit: 0.002) |
| Oil component | % | (1) | Undetected (quantitative limit: 0.01) |
| Presence of asbestos | - | (2) | Undetected |

---- End of Report ----

FIG. 13

TEST REPORT

1. Report No. : CT13-72260
2. Client
   - Name: Vermikorea Inc.
   - Address: 16 Lot, 73 Block, Complex of Namdong Industrial Complex, 643-15 Gojan-dong, Namdong-gu, Incheon, Republic of Korea
   - Date of Receipt: July 12, 2013
   - Date of Issued: August 21, 2013
3. Use of Report: Quality Control
4. Test Sample: Vermiculite board
5. Test Method
   (1) Indoor air quality process test standard (Ministry of Environment Notice No. 2010-24).

6. Test Results
1) Vermiculite Board

| Test Items | Units | Test Items | Test Results |
|---|---|---|---|
| Total volatile organic compounds (TVOC) | mg/(m²·h) | (1) | 0.046 |
| Toluene | mg/(m²·h) | (1) | 0.002 |
| Formaldehyde | mg/(m²·h) | (1) | 0.002 |

---- End of Report ----

| Affirmation | Tested by | Moon-sik Kang | | Technical Manager | Byeong-gwon Ahn |

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose other than use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

Page 1 of 1                                        FormQP-20-01-05(2)

FIG. 14

TEST REPORT

1. Report No. : CT13-66163
2. Client
   ○ Name: Vermikorea Inc.
   ○ Address: 16 Lot, 73 Block, Complex of Namdong Industrial Complex, 643-15 Gojan-dong, Namdong-gu, Incheon, Republic of Korea
   ○ Date of Receipt: June 25, 2013
   ○ Date of Issued: July 01, 2013
3. Use of Report: Quality Control
4. Test Sample: Vermiculite board
5. Test Method
   (1) KCL-FIR-1005:2011

6. Test Results
1) Vermiculite Board

| Test Items | Units | Test Items | Test Results |
|---|---|---|---|
| Far-infrared radiation rate (measurement Temperature: 40 ℃, measurement wavelength: 5 μm to 20 μm) | -- | (1) | 0.909 |
| Far-infrared radiation energy (measurement temperature: 40 ℃, measurement wavelength: 5 μm to 20 μm) | $W/m^2$ | (1) | $3.67 \times 10^2$ |

※ The test results are measurement results with respect to a black body using an FT-IR Spectrometer. End.

---- End of Report ----

| Affirmation | Tested by | Moon-sik Kang | | Technical Manager | Byeong-gwon Ahn | |
|---|---|---|---|---|---|---|

Remarks: 1. This report is a result of tests conducted using a sample provided by the client, and the name of the sample has been submitted by the client. This report does not guarantee the quality of the whole product.
2. This report cannot be used for publicity, propaganda, advertising, and litigation, and is forbidden for any purpose other than use thereof.

President of Korea Conformity Laboratories

Incheon Gyeonggi-do Support: 1007-8 Mansu-dong, Namdong-gu, Incheon, 405-868, Republic of Korea. TEL: 032-460-5100
Result Inquiry: Incheon Gyeonggi-do Support ☎ (032)463-8071

Page 1 of 1    FormQP-20-01-05(2)

FIG. 15

TEST REPORT

| Korea Atomic Energy Research Institute<br>989-111 Daedeok-daero, Yuseong-gu, Daejeon,<br>305-353, Republic of Korea<br>(Tel: 042 868 2880, Fax: 042 863 1289) | Report No.:<br>CT-PM-13-0283<br>Page 1 of 1 |
|---|---|

1. Client
   - Name: Vermikorea Inc.
   - Address: 16 Lot, 73 Block, Complex of Namdong Industrial Complex, 643-15 Gojan-dong, Namdong-gu, Incheon, Republic of Korea
   - Date of Receipt: July 18, 2013

2. Use of Report
   For self-confirmation

3. Items to be tested/material/test sample
   Vermiculite board (Vermiculite eco)

4. Test period
   August 07, 2013 – August 08, 2013

5. Test Method
   HASL-300 Ga-01-R:1997

6. Test environment
   - Temperature: (23 ± 3) □, humidity: (50 ± 3) % R.H.

7. Test Results
   - Gamma nuclide (confidence level: about 95%, k = 2)

| Radionuclide | Radioactivity concentration (Bq/kg) |
|---|---|
| Ra-226 | < 4.05 |
| Th-232 | < 4.82 |
| K-40 | ( 1,462.8 ± 143.28 ) |

[Remarks: < indicates the minimum detection limit (MDA value) or less]

| Affirmation | Tester<br>Name: Doo-won Park | Approver<br>Position: technology officer<br>Name: Keun-sik Choi |
|---|---|---|

August 08, 2013

Korea accreditation organization    President of Korea Atomic Energy Research Institute This report provides test results related to the field which have been accredited by the Korea Laboratory Accreditation Scheme (KOLAS) which has signed the Mutual Recognition Arrangement of the International Laboratory Accreditation Cooperation.

(Annotation 1) Copy and use of the report are prohibited without written consent of the institute.
(Annotation 2) This report relates to test results of the sample provided by the client.

SLIM VERMICULITE BOARD FOR CONSTRUCTION FINISHING

TECHNICAL FIELD

The present invention relates to a slim vermiculite board for construction finishing. More particularly, the present invention relates to a slim vermiculite board for construction finishing which is prepared using liquid potassium silicate, as a binder, to provide good flowability and thus provide satisfactory mixing and does not exhibit efflorescence, a molding time of which may be minimally shortened due to easy addition in a predetermined amount during molding to be massively produced, and which has increased strength and a minimized deformation rate.

BACKGROUND ART

Since vermiculite emits far infrared light which is beneficial to the human body, and has excellent deodorization effect, antibacterial effect, and fire resistance, it is widely used in materials for construction, ceilings of motorcars and trains, wall materials, electronic materials, and the like and is added in powder form to nonflammable paints, coatings, fillers, and the like.

In particular, vermiculite has a characteristic of expanding when it is fired at high temperature. Since such expanded vermiculite has low density and exhibits excellent deodorization effect, antibacterial effect, and fire resistance, it can be manufactured into a board (plate) shape and is being used as an interior or exterior material for construction.

Although vermiculite has various advantages, particle sizes thereof are not uniform, and it is a mineral having many pores with non-uniform sizes and very high deformation. Accordingly, vermiculite has no adhesive force (cohesive force), thereby being manufactured into a vermiculite board using a binder.

Korean Patent No. 10-0695910 (registered on Mar. 20, 2007) discloses a vermiculite board including 100 parts by weight of expanded vermiculite, 50 to 90 parts by weight of an organic binder which includes 70 to 90% by weight of an epoxy resin and 10 to 30% by weight of a phenolic resin, and 1 to 10 parts by weight of clay.

Although the vermiculite board has high strength, the organic binder generates severe exhaust (toxic gas) when it is burned.

Korean Patent No. 10-0760149 (Sep. 18, 2007) discloses an interior material for construction manufactured by mixing and stirring formed stone, which is produced by foam-molding vermiculite, with sodium silicate, and then compression-molding and drying the same.

Although the constructional interior material has excellent flammability, sodium silicate, as a binder, has poor flowability. Accordingly, it is difficult to accomplish uniform mixing, whereby the mixture is partially agglomerated and becomes lumpy. In addition, since the mixture is very sticky, it is difficult to feed the same into a mold in a predetermined amount and, accordingly, it takes long time to produce the constructional interior material.

RELATED ART DOCUMENTS

Patent Documents (Patent Document 1) KR 10-0695910 B1 2007 Mar. 20.
(Patent Document 2) KR 10-0760149 B1 2007 Sep. 18.

DISCLOSURE

Technical Problem

Therefore, the present invention has been made in view of the above problems, and it is one object of the present invention to provide a slim vermiculite board for construction finishing which is prepared using liquid potassium silicate, as a binder, to provide good flowability and thus provide satisfactory mixing and does not exhibit efflorescence, a molding time of which may be minimally shortened due to easy addition in a predetermined amount during molding to be massively produced, and which has increased strength and a minimized deformation rate.

Technical Solution

In accordance with an aspect of the present invention, the above and other objects can be accomplished by the provision of a slim vermiculite board for construction finishing, including 2.5 to 3.5 parts by weight of an additive and 100 to 120 parts by weight of a binder based on 100 parts by weight of fired vermiculite, wherein the additive is titanium dioxide.

The fired vermiculite is produced by firing vermiculite at 1,000 to 1,100° C.

The binder is liquid potassium silicate.

The liquid potassium silicate has a specific gravity (20° C.) of 1.381 to 1.394, a molar ratio of $SiO_2$ to $K_2O$ is 3.15 to 3.35, and the liquid potassium silicate has a viscosity of 0.7 to 0.9 cps at 20° C.

The liquid potassium silicate includes 11.5% by weight of $K_2O$ and 24% by weight of $SiO_2$.

The liquid potassium silicate maintains temperatures of 25 to 30° C. and humidity of 54 to 56%.

Advantageous Effects

As apparent from the fore-going, the present invention advantageously provides a slim vermiculite board for construction finishing which has natural vermiculite patterns and various colors, and thus, can help create a beautiful and luxurious interior. In addition, the slim vermiculite board does not produce construction waste, can be used as an agricultural soil conditioner, and is light.

Further, the slim vermiculite board is deformation-free, eco-friendly, and advantageously has excellent deodorization effect, antibacterial effect, fire resistance, and sound absorption coefficient.

BEST MODE

Hereinafter, the present invention is described in detail.

Conventional vermiculite boards produced using vermiculite, as a main material, have generally been used as an industrial insulator or core material.

Conventional vermiculite boards exhibit efflorescence and collapse due to deformation, when exposed to water or air. Accordingly, vermiculite boards have not been used as finishing materials for construction.

In the case of conventional finishing materials for construction, pearlite is used as a main material and vermiculite is included in an amount of 30% or less therein.

The present invention is advantageous in that, although pearlite is not used and vermiculite is only used as a finishing material for construction, deliquescence is improved, efflorescence is not exhibited, and a vermiculite board is not deformed.

First, the slim vermiculite board for construction finishing according to the present invention is described in detail.

The slim vermiculite board for construction finishing of the present invention preferably includes 2.5 to 3.5 parts by weight of an additive and 100 to 120 parts by weight of a binder based on 100 parts by weight of fired vermiculite.

The fired vermiculite is preferably fired at 1,000 to 1,100° C. When the fired vermiculite is fired at less than 1,000° C., vermiculite incompletely fired is partially present, whereby the weight increases, absorption performance is decreased, and color is non-uniform. When the fired vermiculite is fired at greater than 1,100° C., particles are crumbled, and powder is blown and aggregates into clumps when blended.

The additive is preferably included in an amount of 2.5 to 3.5 parts by weight based on 100 parts by weight of the fired vermiculite. When the additive is included in an amount of 2.5 parts by weight, cohesive force is decreased, whereby strength is decreased. When the additive is included in an amount of greater than 3.5 parts by weight, strength is slightly improved, but clumps are generated and powder blocks pores when blended, whereby absorption performance is decreased.

The additive is preferably titanium dioxide, but the present invention is not limited thereto.

Titanium dioxide has a high brightness, is satisfactorily mixed with a mixture, and increases strength.

The present invention is characterized in that titanium dioxide is inserted between pores of fired vermiculite so that cohesive force (adhesiveness) is increased and uniform pore state is maintained.

The present invention is characterized in that liquid potassium silicate (potassium silicate solution) is used as the binder.

When liquid sodium silicate is used as a binder, flowability is poor and thus it is difficult to accomplish uniform blending. Accordingly, partial aggregation occurs and clumps are generated. In addition, a mixture is very sticky, whereby it is difficult to feed the mixture in a predetermined amount into a mold, which causes long production time.

Since the present invention uses liquid potassium silicate as a binder, a mixture having a smooth surface and a viscous inside is generated, easy blending is accomplished due to good flowability, and efflorescence is not exhibited. In addition, the mixture may be easily fed in a predetermined amount during molding, whereby a molding time may be minimally shortened, which makes mass production possible. Further, strength is improved and deformation rate is minimized.

The present invention is characterized in that the specific gravity of liquid potassium silicate, a molar ratio of $SiO_2$ to $K_2O$ therein, and the viscosity thereof are adjusted, thereby producing an optimal a binder for a vermiculite board.

In the present invention, liquid potassium silicate preferably has a pH of 11 to 12 and a specific gravity (20° C.) of 1.381 to 1.394, a molar ratio of $SiO_2$ to $K_2O$ therein is preferably 3.15 to 3.35, and the viscosity thereof at 20° C. is preferably 0.7 to 0.9 cps.

According to the present invention, liquid potassium silicate preferably has a specific gravity (20° C.) of 1.381 to 1.394. When the specific gravity (20° C.) is less than 1.381, adhesive force is decreased, whereby strength is decreased. When the specific gravity (20° C.) is greater than 1.394, the binder becomes sticky, whereby it is difficult to perform blending and molding.

A molar ratio of liquid potassium silicate is calculated according to the following equation:

$$\text{Molar ratio of potassium silicate} = \text{Weight ratio of } SiO_2/K_2O \times 1.568$$

In the liquid potassium silicate according to the present invention, a molar ratio of $SiO_2$ to $K_2O$ is preferably 3.15 to 3.35. When a molar ratio of $SiO_2$ to $K_2O$ is less than 3.15, heat resistance slightly increases, but adhesive force is decreased. When a molar ratio of $SiO_2$ to $K_2O$ is greater than 3.35, adhesive force is improved due to increased viscosity, but a binder becomes sticky. Accordingly, it is difficult to perform blending and molding.

Liquid potassium silicate according to the present invention more preferably includes 11.5% by weight of $K_2O$ and 24% by weight of $SiO_2$.

The liquid potassium silicate according to the present invention preferably has a viscosity of 0.7 to 0.9 cps at 20° C. When the viscosity thereof at 20° C. is less than 0.7 cps, it is easy to perform blending due to good flowability, but strength is deteriorated due to decreased adhesive force. When the viscosity thereof at 20° C. is greater than 0.9 cps, adhesive force is improved, but a binder becomes sticky. Accordingly, it is difficult to perform blending and molding.

The liquid potassium silicate is preferably maintained at temperatures of 25 to 30° C. and humidity of 54 to 56% which are most suitable conditions to exhibit the properties of vermiculite.

The binder is preferably included in an amount of 100 to 120 parts by weight based on 100 parts by weight of the fired vermiculite. When the binder is included in an amount of less than 100 parts by weight, adhesive force is remarkably decreased and heat resistance is deteriorated. When the binder is included in an amount of greater than 120 parts by weight, the weight and the viscosity increase, whereby it is difficult to perform molding.

The present inventors have filed an application for "Apparatus for manufacturing vermiculite board and method of manufacturing the same," and this application has been registered (Korean Patent No. 10-1132034, Apr. 2, 2012).

Figure 1:
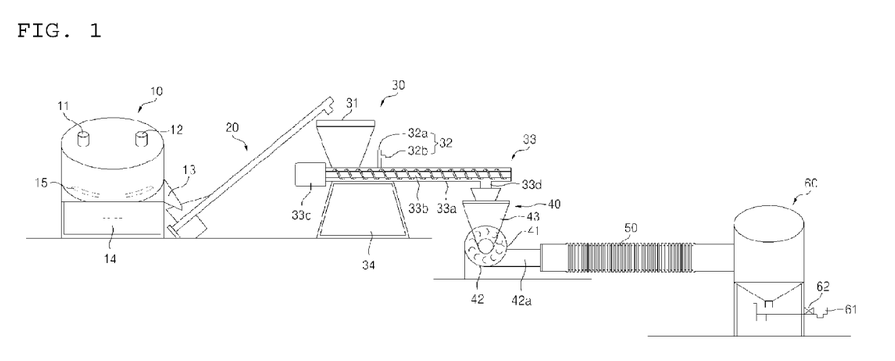
FIG. 1 is a schematic diagram illustrating a process of continuously mixing raw materials, such as vermiculite, titanium dioxide, and a binder, using a raw material mixer equipped with an apparatus for producing a vermiculite board and a process of storing the resultant mixture using a storage equipped with the apparatus.

FIG. 1 is a schematic diagram illustrating a process of continuously mixing raw materials, such as vermiculite, titanium dioxide, and a binder, using a raw material mixer equipped with an apparatus for producing a vermiculite board and a process of storing the resultant mixture using a storage equipped with the apparatus.

Figure 2:
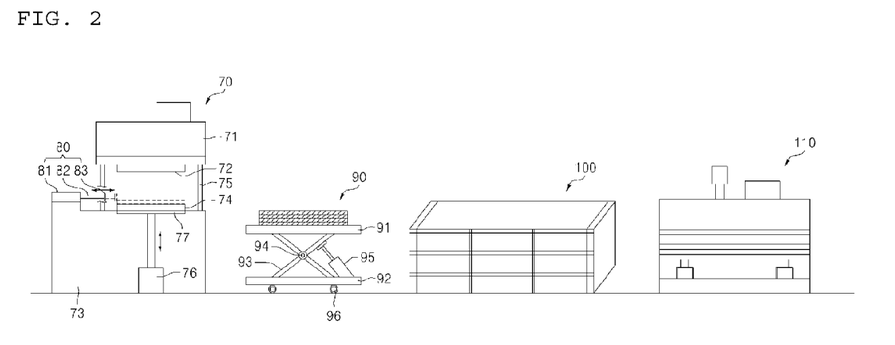
FIG. 2 is a schematic diagram illustrating a molding apparatus for molding a vermiculite board using the final mixture mixed by means of the raw material mixer illustrated in FIG. 1.

FIG. 2 is a schematic diagram illustrating a molding apparatus for molding a vermiculite board using the final mixture mixed by means of the raw material mixer illustrated in FIG. 1.

Figure 3:
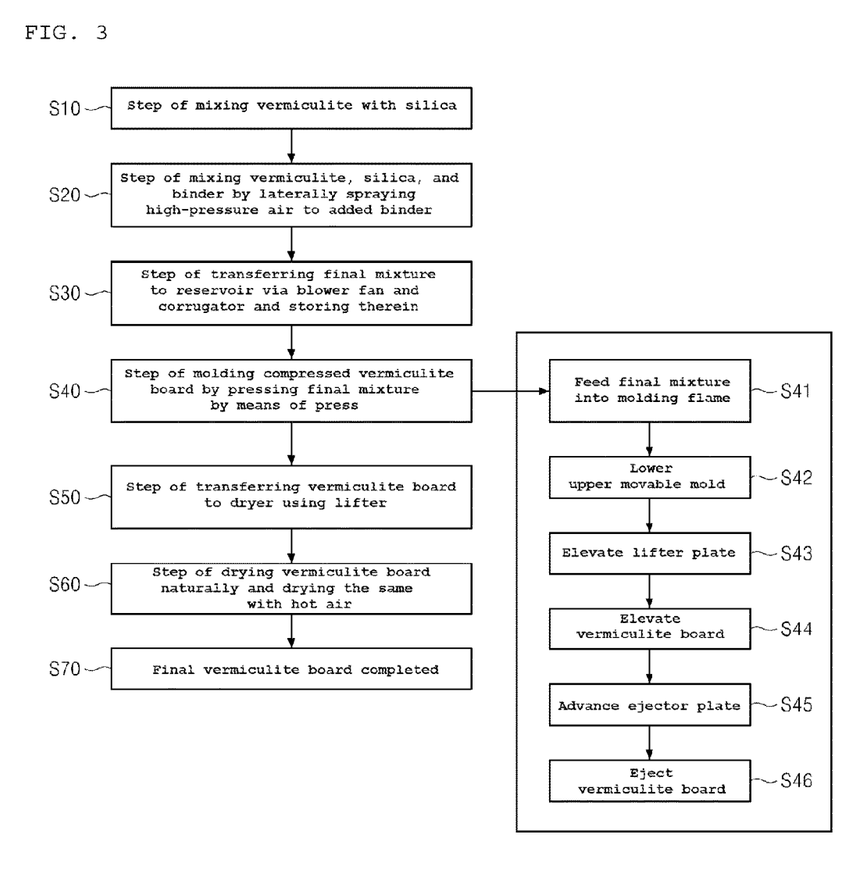
FIG. 3 is a series of process flowcharts illustrating a method of manufacturing a vermiculite board.

FIG. 3 is a series of process flowcharts illustrating a method of manufacturing a vermiculite board.

The application, entitled "Apparatus for manufacturing vermiculite board and method of manufacturing the same" (Korean Patent No. 10-1132034), which has been previously filed by the present inventors is characterized in that a binder in a mixture is not aggregated while uniformly mixing vermiculite and the binder in a continuous mixing process, so that the mixture may be fed in a predetermined amount into a press and a vermiculite board may be manufactured though a single press process at room temperature, which allows uniform quality obtainment and facilitates mass production.

The vermiculite board of the present invention is manufactured using the apparatus for manufacturing a vermiculite board and the method of manufacturing the same disclosed in the previous application (Korean Patent No. 10-1132034). Accordingly, detailed descriptions of the apparatus and the method are omitted.

Hereinafter, the constitution and functions of the present invention are described in more detail with reference to examples of the present invention. However, the following examples are merely provided as preferred embodiments and, therefore, the present invention is not limited to the examples.

Example 1

Vermiculite was fired at 1,000° C., thereby producing fired vermiculite. 3 parts by weight of titanium dioxide were fed into a first mixer containing 100 parts by weight of the fired vermiculite. The mixture including vermiculite and titanium dioxide was discharged and supplied to a second mixer by a first transfer screw (S10). Next, liquid potassium silicate with a humidity of 55% at 27° C. was supplied to the mixture of vermiculite and titanium dioxide which had been supplied to the second mixer. Here, high-pressure air was sprayed to the liquid potassium silicate in a direction perpendicular to a feeding direction of the liquid potassium silicate such that the liquid potassium silicate was dispersed and supplied in a small particle form without aggregation (S20). The liquid potassium silicate was used in an amount of 100 parts by weight based on 100 parts by weight of the fired vermiculite. The liquid potassium silicate was produced to have a specific gravity (20° C.) of 1.390, a molar ratio of $SiO_2$ to $K_2O$ of 3.25, and a viscosity of 0.8 cps at 20° C. Here, since the second mixer was a transfer screw-type mixer, the liquid potassium silicate was continuously supplied in a constant amount to the mixture of vermiculite and titanium dioxide continuously flowing through the transfer screw. Next, a final mixture including vermiculite, titanium dioxide, and liquid potassium silicate discharged from the second mixer was introduced into a blowing fan assembly and pumped into a storage via a corrugator by flowing force of the blowing fan. Here, the final mixture was first collided with the blowing fan, and then secondarily collided with a corrugated part of the corrugator, whereby a binder gathered in a wing shape was finally dispersed into small particles, resulting in uniform mixing (S30). Next, the final mixture stored in the storage was pressed using a press, thereby molding a compressed vermiculite board (S40). More particularly, a molding frame of the press was filled with the final mixture through a hose lengthily extended from a discharge pipe of the storage (S41). Next, in the state in which the molding frame of the press was filled with the final mixture, an upper movable mold was lowered to press the final mixture, whereby the final mixture was compression-molded and thus a plate-type vermiculite board was produced (S42). Subsequently, when the vermiculite board was elevated to an upper part of the molding frame (S44) while a lifter plate of a fixed lower mold constituting a bottom of the molding frame was elevated by the operation of a lifting cylinder (S43), the vermiculite board was discharged to the outside of the press by an ejector plate through advancing operation of a cylinder rod of an ejector (S45, S46). Next, the vermiculite board discharged to the outside of the press was stacked on a lifter disposed at one side of the press. Here, since the height of the lifter was adjustable, a plurality of vermiculite boards was stacked while adjusting the height of the lifter according to the height of the vermiculite board discharged from the press and the height of the vermiculite boards stacked on the lifter (S50). Next, when a plurality of vermiculite boards was stacked on the lifter, the vermiculite boards were transferred to a first dryer, and each of the vermiculite boards was placed on a drying plate of the first dryer and was naturally dried for a predetermined time (S60). Finally, the vermiculite board naturally dried in the first dryer was transferred to a second dryer and was subjected to hot air drying for a predetermined time, thereby manufacturing a final vermiculite board product (S70).

Figure 4:
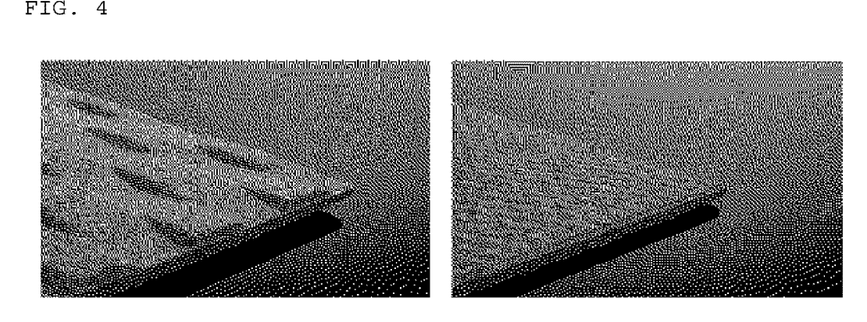
FIG. 4 illustrates photographs of a slim vermiculite board for construction finishing manufactured by variously processing a surface of a vermiculite board manufactured according to Example 1.

Photographs of a slim vermiculite board for construction finishing manufactured by variously molding a surface of a vermiculite board produced as described above are illustrated in FIG. 4.

Comparative Example 1

Figure 5:
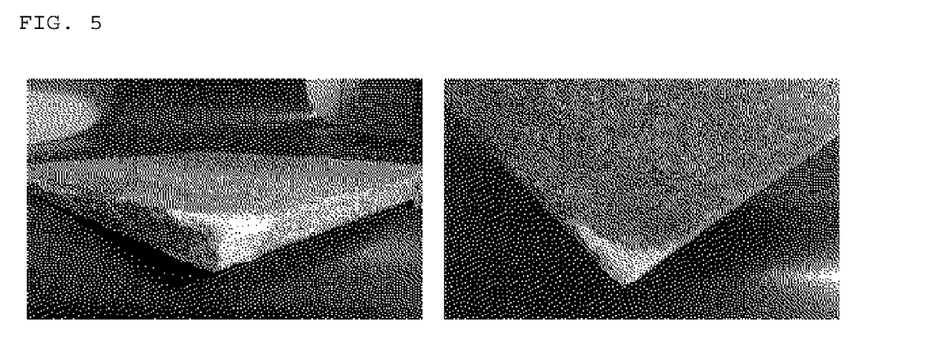
FIG. 5 illustrates photographs of a vermiculite board manufactured according to Comparative Example 1.

50 parts by weight of a binder were mixed with 100 parts by weight of a mixture including 70% by weight of pearlite and 30% by weight of vermiculite, thereby manufacturing a vermiculite board. Photographs of the vermiculite board are illustrated in FIG. 5. Here, liquid sodium silicate was used as a binder.

Experimental Example 1

The properties of the vermiculite board manufactured according to Example 1 and the vermiculite board manufactured according to Comparative Example 1 are summarized in Table 1.

TABLE 1

| Classification | Comparative Example 1 | Example 1 | Characteristics of Example 1 |
|---|---|---|---|
| Firing temperature | 1,150° C. | 1,000° C. | |
| Properties Upon compression | Hard Broken | Soft Not broken (pressed trail) | |
| Post-processing | Necessary (coating, grinding, etc.) | Unnecessary | |
| Pattern/design | plane | Various | Product having natural vermiculite pattern and various colors is manufactured. Accordingly, it is possible to create a beautiful and luxurious interior. |
| Adhesive | Efflorescence | No efflorescence | |
| Impact resistance | Weak | Strong | |
| Carrying/transfer | Broken | Transfer is easy. | |
| Loss rate | 40% or more | About 1% | |
| Recyclability | Impossible | Possible | Useable as an agricultural soil conditioner without generation of construction waste |
| Processability | Insufficient (no manual operation) | Excellent (manually cuttable) | |
| Constructability | Construction equipment used | Easy construction | Light and easily worked with general tool such as saw, knife, screw, or nail. Workability is excellent. |
| Color | Partially possible | Can be colored | |
| Rainy season (exposure to water) | Swollen in short time | Three months or more | |
| Density | Low density | Adjustable to high density | |
| Mold processability | Attached | Not attached (residues are removable by air injection) | |
| Skin contact property | Hot in contact with skin | Not hot in contact with skin | 100% natural mineral that is not harmful to human body and environment |
| Heat resistance | Weak | Strong | |
| Molding state | Efflorescence frequently occurs | Satisfactory | |

The slim vermiculite board according to Example 1 has natural vermiculite patterns and various colors and thus can help create a beautiful and luxurious interior, compared to the slim vermiculite board according to Comparative Example 1. In addition, the slim vermiculite board according to Example 1 does not produce construction waste, can be used as an agricultural soil conditioner, and is light.

Experimental Example 2

Figure 6:
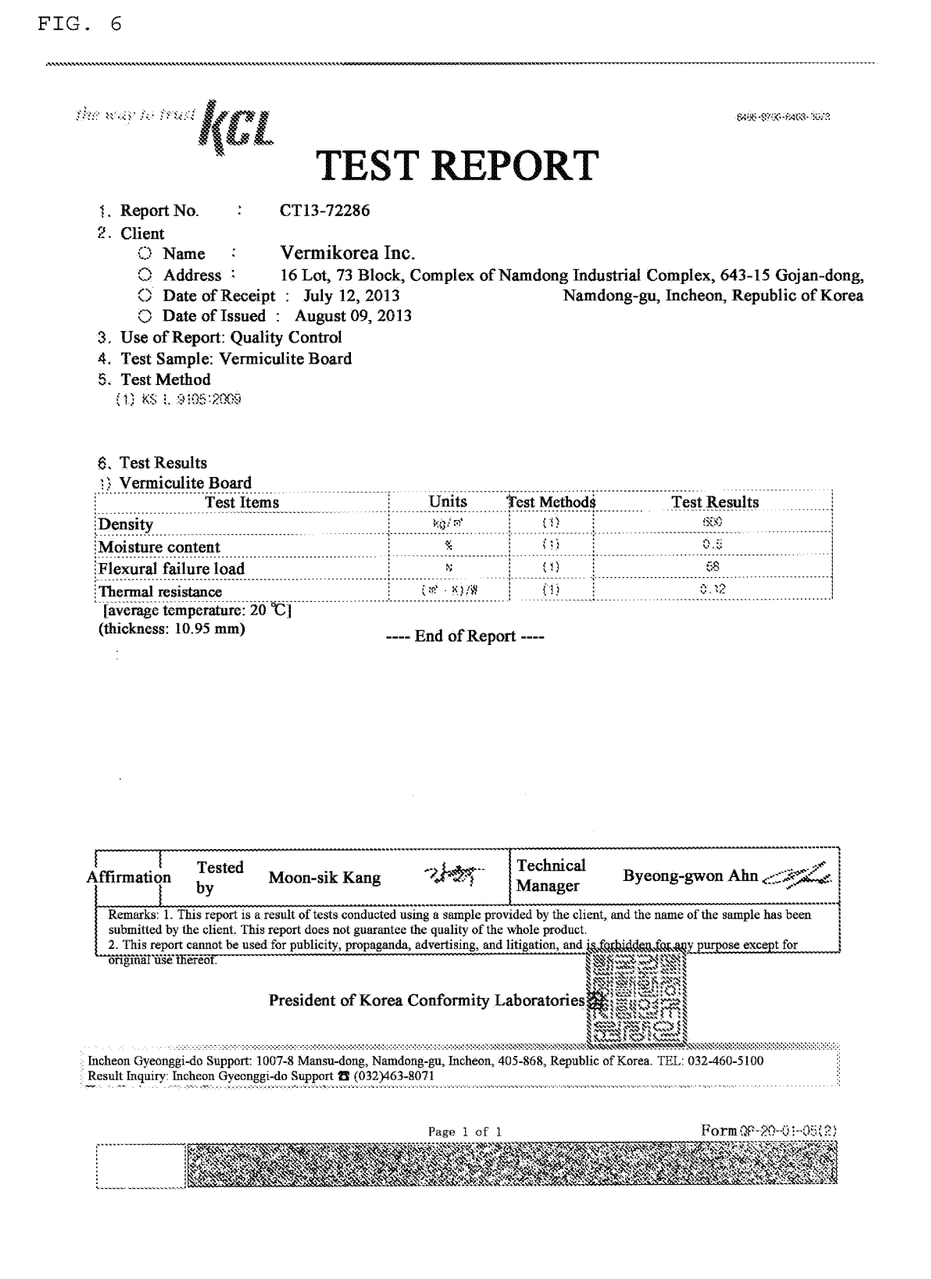
FIG. 6 illustrates a test report on moisture content, flexural failure load, and thermal resistance of a vermiculite board manufactured according to Example 1.
Figure 7:
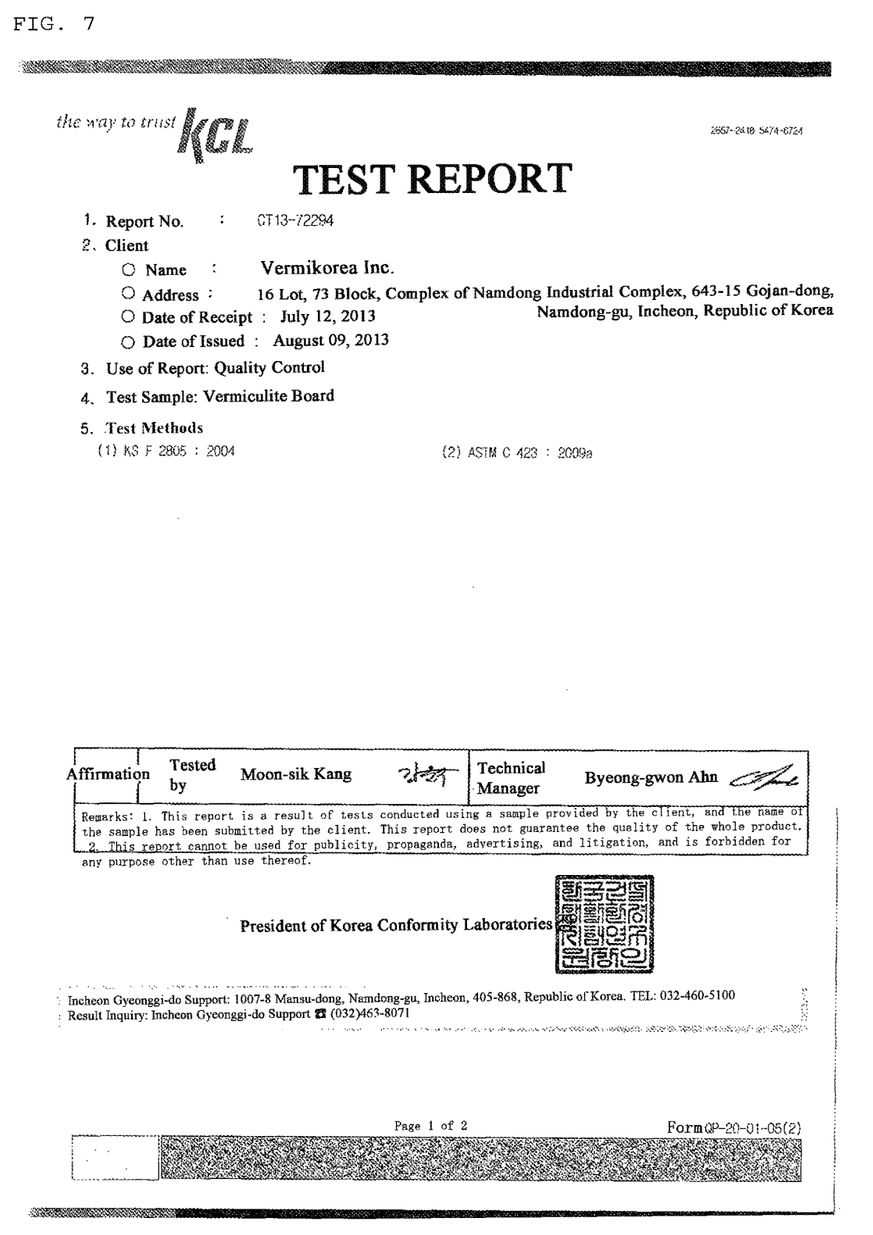
FIGS. 7 and 8 illustrate test reports on a sound absorption coefficient of a vermiculite board manufactured according to Example 1.
Figure 8:
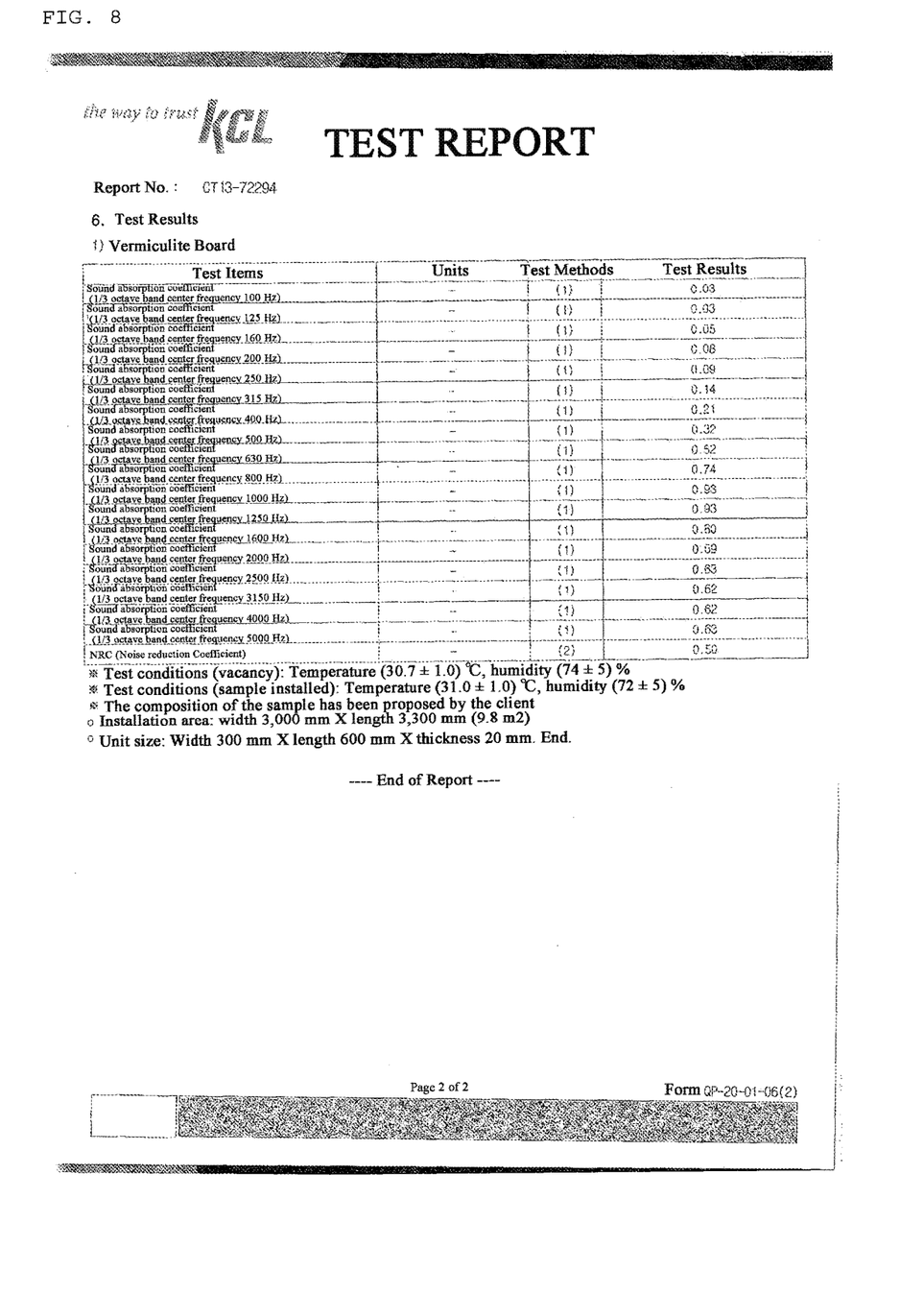
Figure 9:
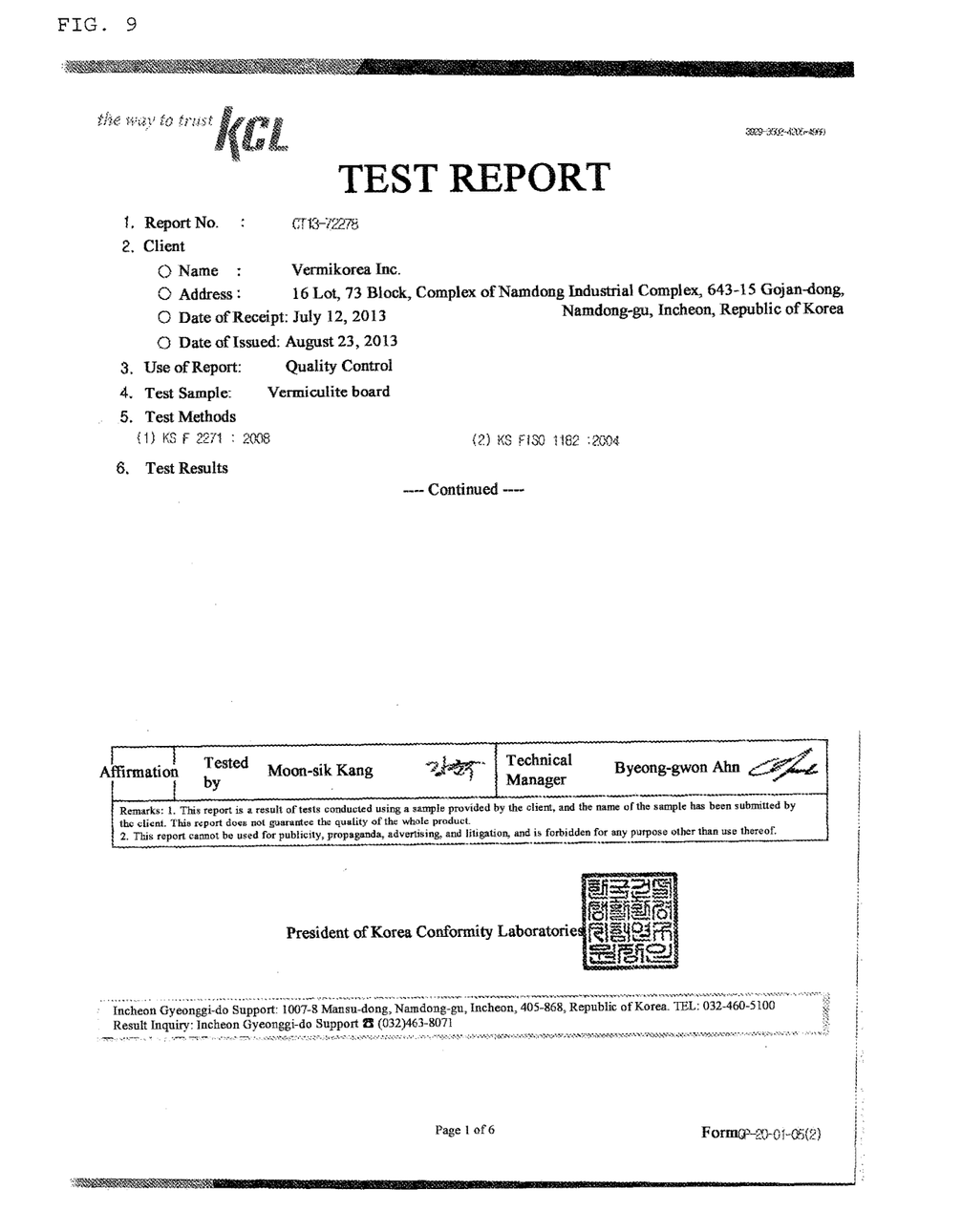
FIGS. 9 and 10 illustrate reports on an incombustibility test and a gas hazard test of a vermiculite board manufactured according to Example 1.
Figure 10:
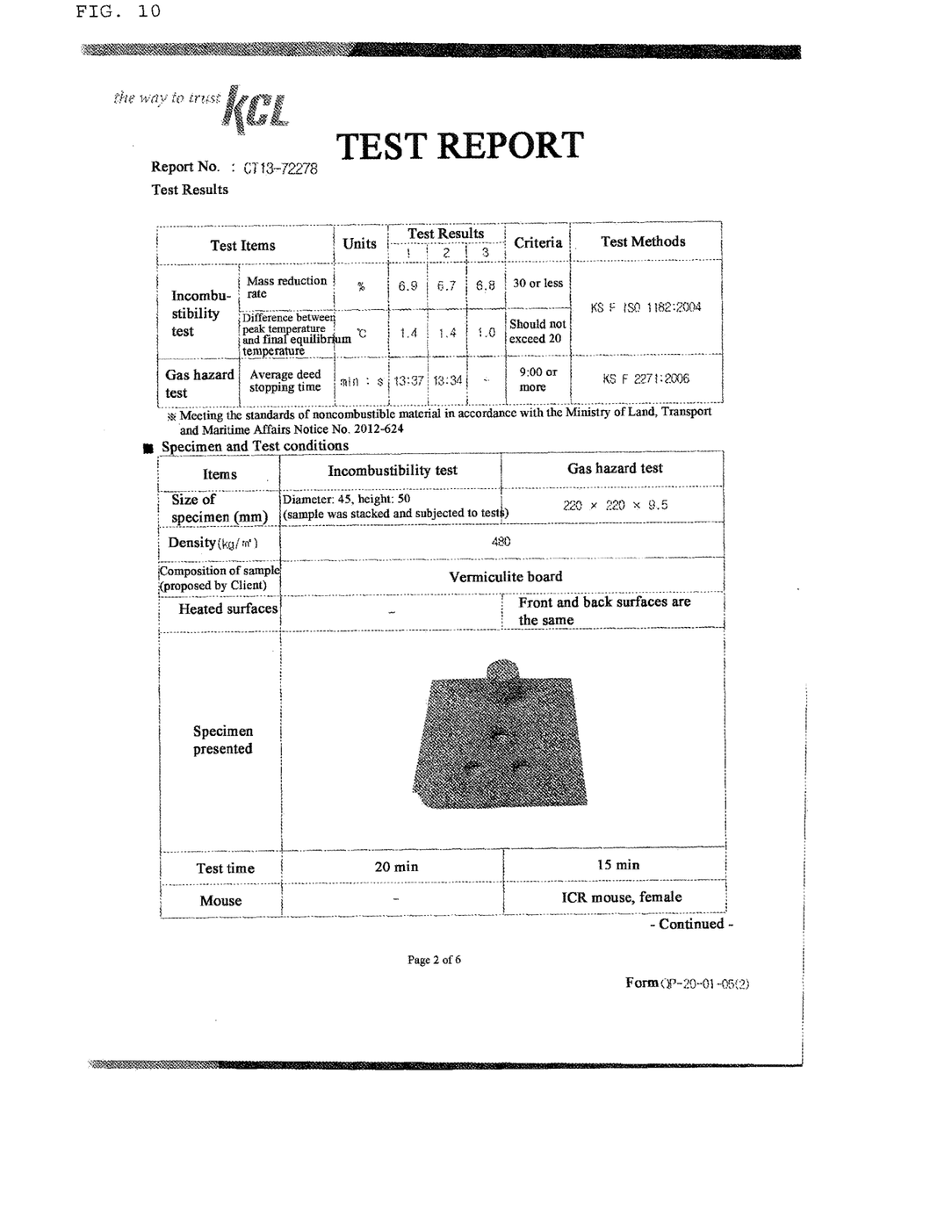
Figure 11:
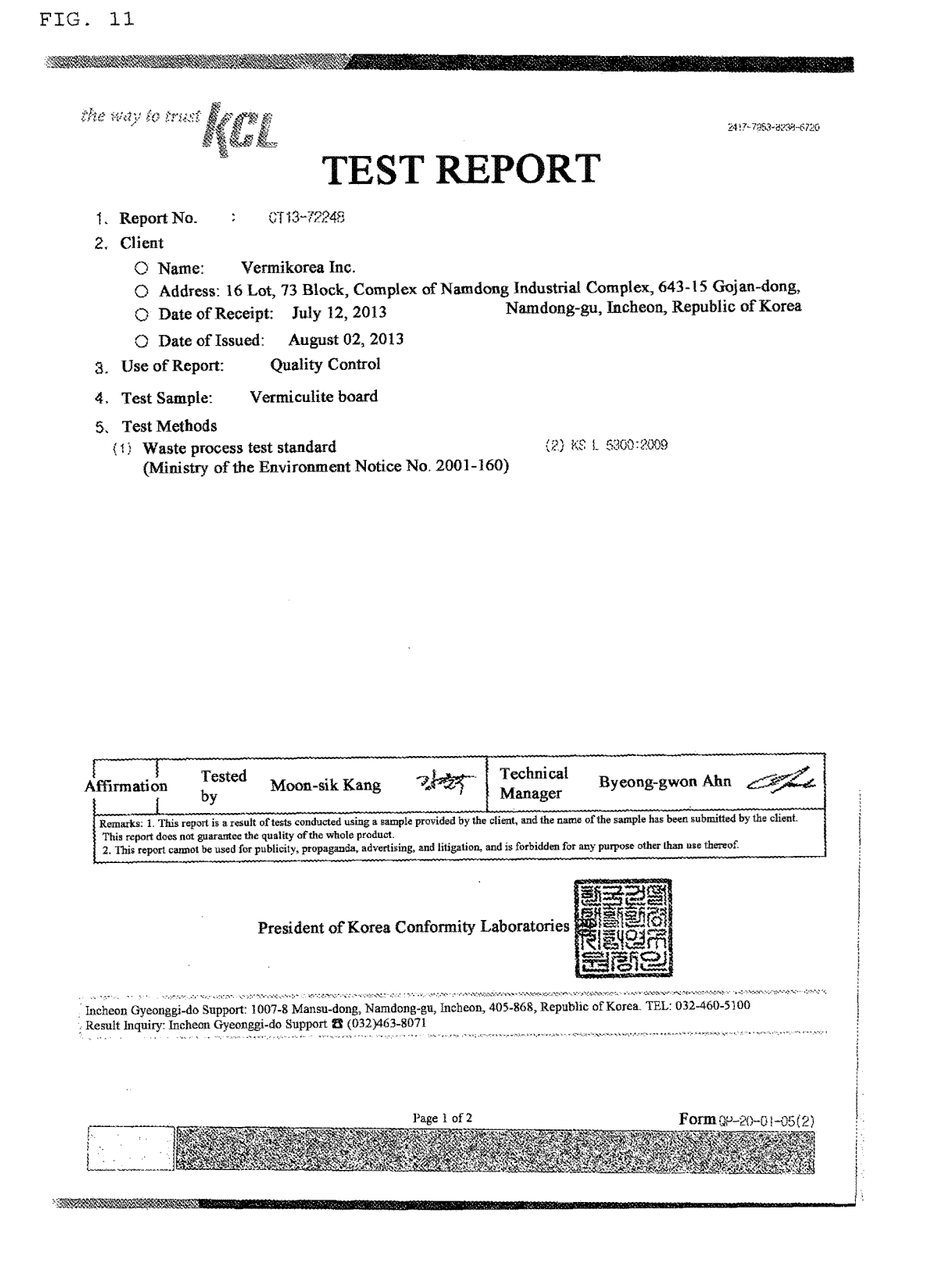
FIGS. 11 and 12 illustrate a heavy metal presence test report and a harmful substance presence test report on a vermiculite board manufactured according to Example 1.
Figure 12:
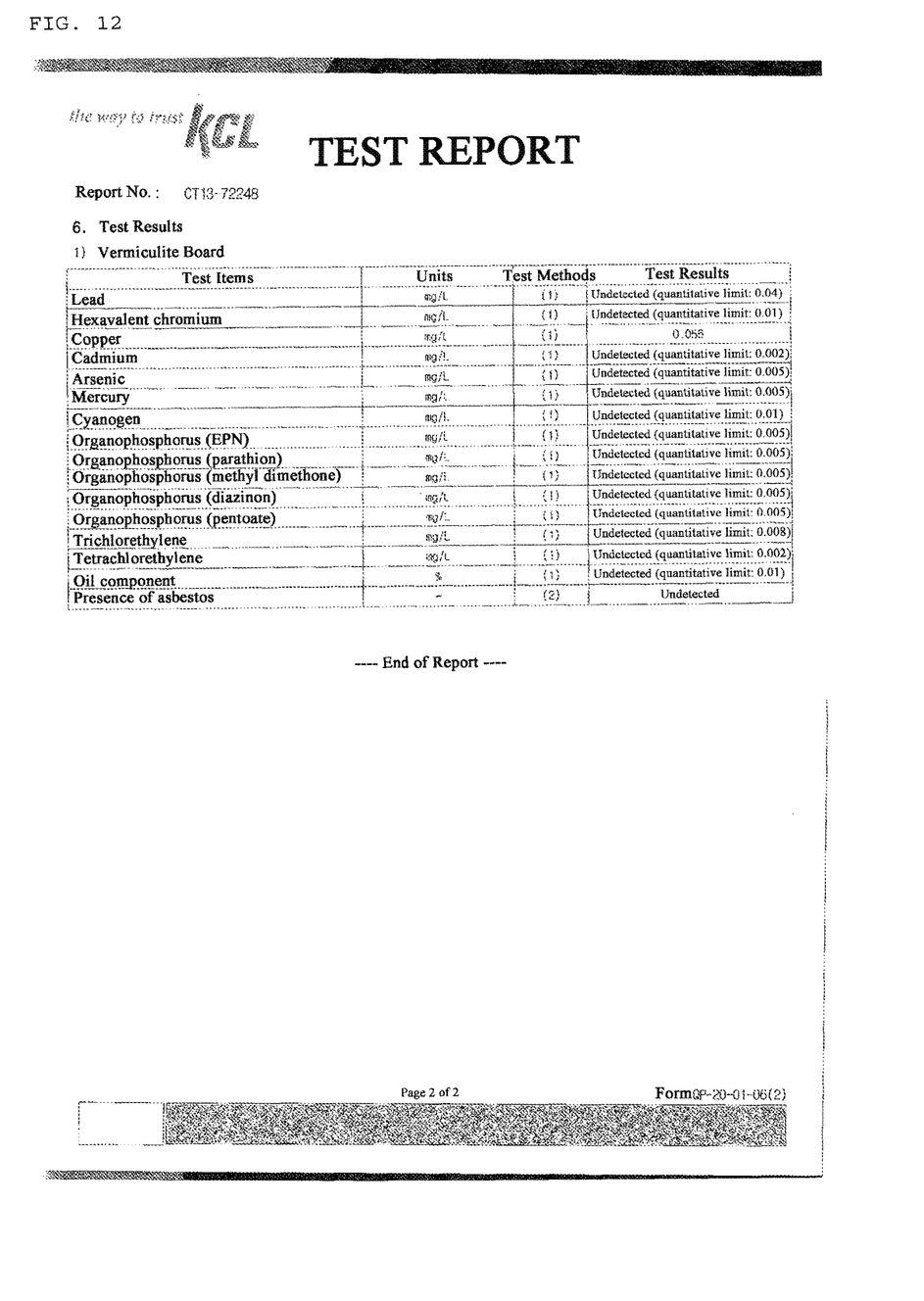
Figure 13:
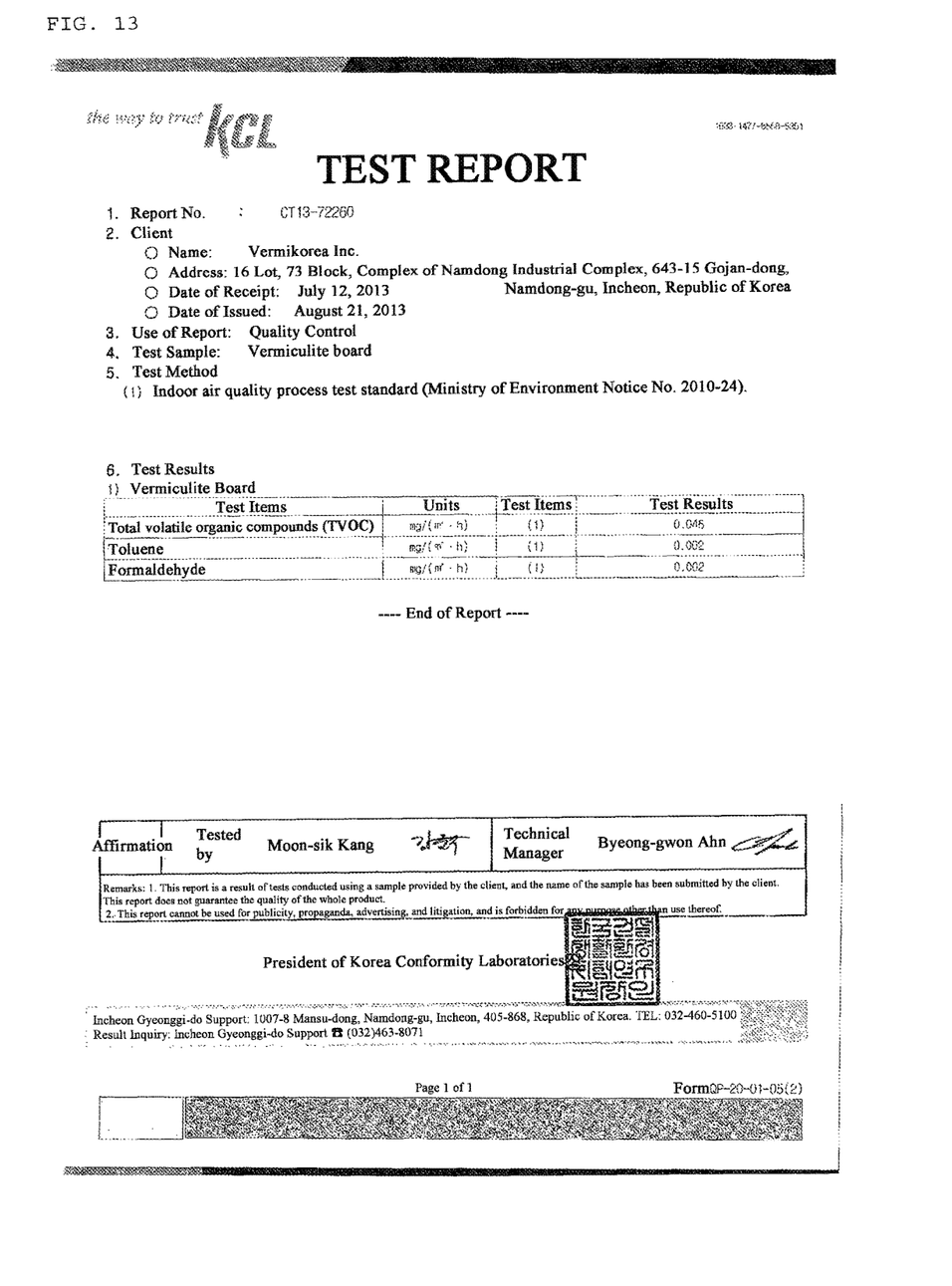
FIG. 13 illustrates a report on a total volatile organic compound presence test, a toluene presence test, and a formaldehyde presence test of a vermiculite board manufactured according to Example 1.
Figure 14:
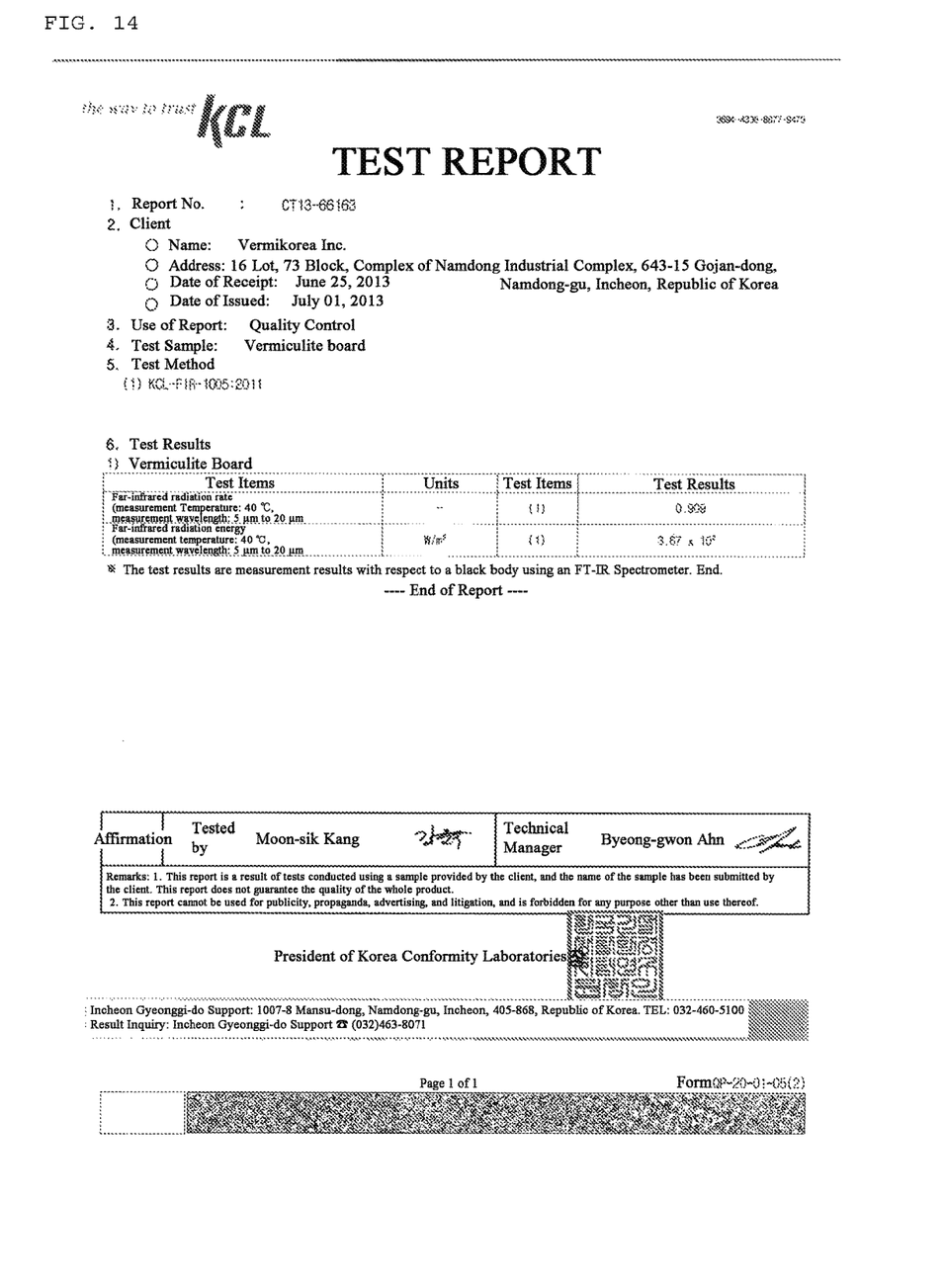
FIG. 14 illustrates a report on a far-infrared radiation rate test and a far-infrared radiation energy test of a vermiculite board manufactured according to Example 1.
Figure 15:
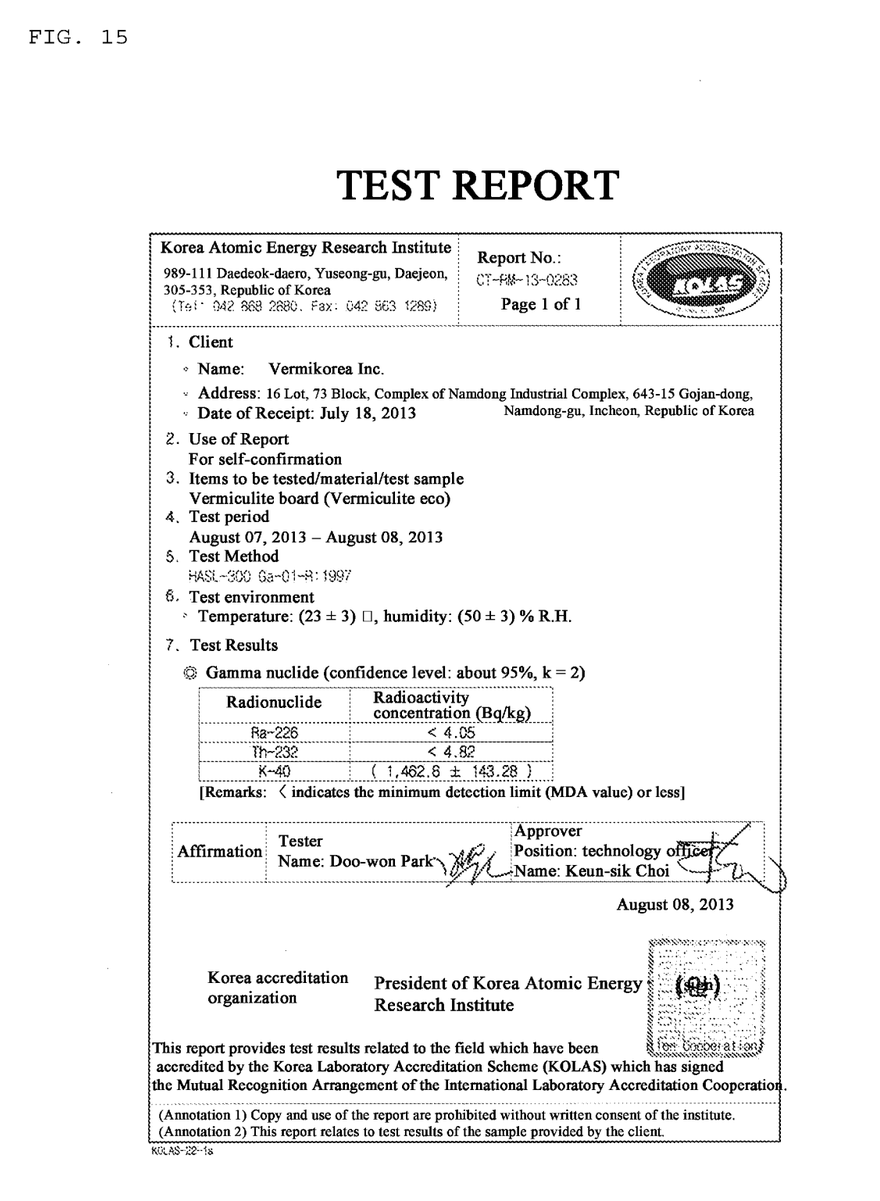
FIG. 15 illustrates a radioactivity index test report on a vermiculite board manufactured according to Example 1.

The performance of the vermiculite board manufactured according to Example 1 was evaluated and summarized in Table 2. A report on moisture content, flexural failure load, and thermal resistance tests is illustrated in FIG. 6, reports on a sound absorption coefficient test are illustrated in FIGS. 7 and 8, reports on incombustibility and gas hazard tests are illustrated in FIGS. 9 and 10, reports on heavy metal and harmful substance presence tests are illustrated in FIGS. 11 and 12, a report on total volatile organic compounds, toluene, and formaldehyde presence tests are illustrated in FIG. 13, a report on far-infrared radiation rate and far-infrared radiation energy tests is illustrated in FIG. 14, and a report on a radioactivity index test is illustrated in FIG. 15.

TABLE 2

| Evaluation items | Evaluation methods | Criteria | Performance | Report No. |
|---|---|---|---|---|
| Moisture content (%) | KS L 9105:20009 | 3.0 or less | 0.5 | CTS13-72286 |
| Flexural failure load (N) | | 40 or more | 68 | |
| Thermal resistance (m² · K)/W | | 0.28 or more | 0.12 | |
| Noise reduction coefficient (NRC) | KS F 2805:2004ASTM C 423:2009a | 0.41 to 0.60 | 0.50 | CT13-72294 |
| Incombustibility test, mass reduction rate (%) | KD FISO 1182:2004 | 9:00 or more | 13:34 | CT13-72278 |
| Incombustibility test, difference between peak temperature and final equilibrium temperature (° C.) | | Should not exceed 20 | 1.4 | |
| Gas hazard test average, deed stopping time (min:s) | KS F 2271:2006 | 30 or less | 6.9 | |
| Lead (mg/l) | Waste process test standard (Ministry of the Environment Notice No. 2001-160) | Less than 3 | Undetected | CT13-72248 |
| Hexavalent chromium (mg/l) | | Less than 1.5 | Undetected | |
| Copper (mg/l) | | Less than 3 | 0.056 | |
| Cadmium (mg/l) | | Less than 0.3 | Undetected | |
| Arsenic (mg/l) | | Less than 1.5 | Undetected | |
| Mercury (mg/l) | | Less than 0.005 | Undetected | |
| Cyanogen (mg/l) | | Less than 1 | Undetected | |
| Organophosphorus (EPN) (mg/l) | | Less than 1 | Undetected | |
| Organophosphorus (parathion) (mg/l) | | Less than 1 | Undetected | |
| Organophosphorus (methyl dimethone) (mg/l) | | Less than 1 | Undetected | |

TABLE 2-continued

| Evaluation items | Evaluation methods | Criteria | Performance | Report No. |
| --- | --- | --- | --- | --- |
| Organophosphorus (diazinon) (mg/l) | | Less than 1 | Undetected | |
| Organophosphorus (pentoate) (mg/l) | | Less than 1 | Undetected | |
| Trichlorethylene (mg/l) | | Less than 0.3 | Undetected | |
| Tetrachlorethylene (mg/l) | | Less than 0.1 | Undetected | |
| Oil component (%) | | Less than 5 | Undetected | |
| Asbestos containment | KS L 5300 | Less than 1 | Undetected | |
| Total volatile organic compounds (TVOC) (mg/(m$^2$ · h)) | Indoor air quality process test standard (Ministry of Environment Notice No. 2010-24) | 0.4 or less | 0.045 | CT13-72260 |
| Toluene (mg/(m$^2$ · h)) | | 0.080 or less | 0.002 | |
| Formaldehyde (mg/(m$^2$ · h)) | | 0.120 or less | 0.002 | |
| Far-infrared radiation rate | KCL-FIF-1005:2011 | — | 0.909 | CT13-66163 |
| Far-infrared radiation energy (W/m$^2$) | | — | 3.67 × 10$^2$ | |
| Radioactivity index | HASL-300 Ga-01-R:1997 | 1.0 or less | 0.53187 | CT-RM-13-0283 |

As shown in Table 2, it can be confirmed that the vermiculite board according to the present invention is deformation-free and eco-friendly and exhibits excellent deodorization effect, antibacterial effect, fire resistance, and sound absorption coefficient.

The invention claimed is:

1. A slim vermiculite board for construction finishing, comprising 2.5 to 3.5 parts by weight of an additive and 100 to 120 parts by weight of a liquid potassium silicate binder based on 100 parts by weight of fired vermiculite, wherein the fired vermiculite is produced by firing vermiculite at 1,000 to 1,100° C., the additive is titanium dioxide, the binder has a specific gravity (20° C.) of 1.381 to 1.394, a molar ratio of SiO$_2$ to K$_2$O is 3.15 to 3.35, and has a viscosity of 0.7 to 0.9 cps at 20° C.

2. The slim vermiculite board according to claim 1, wherein the liquid potassium silicate comprises 11.5% by weight of K$_2$O and 24% by weight of SiO$_2$.

* * * * *